US011595586B2

(12) United States Patent
Lee et al.

(10) Patent No.: US 11,595,586 B2
(45) Date of Patent: Feb. 28, 2023

(54) ELECTRONIC DEVICE INCLUDING CAMERA MODULE SHOOTING THROUGH AT LEAST ONE PORTION OF DISPLAY DEVICE

(71) Applicant: Samsung Electronics Co., Ltd., Suwon-si (KR)

(72) Inventors: Kyeongeun Lee, Suwon-si (KR); Jaecheol Bae, Suwon-si (KR); Sangpil Lee, Suwon-si (KR); Dongkeun Jung, Suwon-si (KR); Sunggoo Her, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/180,674

(22) Filed: Feb. 19, 2021

(65) Prior Publication Data
US 2021/0258467 A1  Aug. 19, 2021

(30) Foreign Application Priority Data

Feb. 19, 2020 (KR) .................. 10-2020-0020652

(51) Int. Cl.
*H04N 5/235* (2006.01)
*H04N 5/225* (2006.01)

(52) U.S. Cl.
CPC ......... *H04N 5/2354* (2013.01); *H04N 5/2257* (2013.01); *H04N 5/2258* (2013.01)

(58) Field of Classification Search
CPC .. H04N 5/2354; H04N 5/2257; H04N 5/2258; H04N 5/23293; H04M 1/72403; H04M 2201/38; H04M 2250/52
See application file for complete search history.

(56) References Cited

U.S. PATENT DOCUMENTS 8,284,176 B2 * 10/2012 Nakajima ......... G02F 1/133514
345/207
9,143,668 B2   9/2015 Mathew et al.
9,936,113 B2   4/2018 Lee et al.
(Continued)

FOREIGN PATENT DOCUMENTS

KR   20120046040 A   5/2012
KR   20170030789 A   3/2017
(Continued)

OTHER PUBLICATIONS

International Search Report and Written Opinion of the International Searching Authority in connection with International Application No. PCT/KR2021/002018 dated Jun. 16, 2021, 10 pages.

*Primary Examiner* — Luong T Nguyen

(57) ABSTRACT

Disclosed is an electronic device including a camera module including at least one lens, a display including a camera exposure region at least partially overlapping with the lens and a border region surrounding a periphery of the camera exposure region in a direction corresponding to an optical axis of the lens, and a processor operatively connected to the camera module and the display. When a shooting-related application is executed or when the camera module is activated, the processor may control a luminance of the border region to be within a specified range. Besides, various embodiments as understood from the specification are also possible.

20 Claims, 13 Drawing Sheets

(56) References Cited

U.S. PATENT DOCUMENTS

| | | | |
|---|---|---|---|
| 10,009,525 B2 | 6/2018 | Mathew et al. | |
| 10,331,164 B2 | 6/2019 | Bao | |
| 2009/0179880 A1* | 7/2009 | Nakajima | G02F 1/133514 345/207 |
| 2014/0063356 A1 | 3/2014 | Liao | |
| 2016/0212311 A1* | 7/2016 | Mathew | G06F 1/1626 |
| 2017/0078543 A1* | 3/2017 | Lee | H04N 5/2257 |
| 2017/0084231 A1* | 3/2017 | Chew | G09G 3/20 |
| 2019/0197944 A1* | 6/2019 | Kim | G09G 3/30 |
| 2019/0246018 A1 | 8/2019 | Rho et al. | |
| 2021/0174769 A1 | 6/2021 | Jeong et al. | |

FOREIGN PATENT DOCUMENTS

| | | |
|---|---|---|
| KR | 10-2017-0096565 A | 8/2017 |
| KR | 20190091557 A | 8/2019 |

\* cited by examiner

ELECTRONIC DEVICE INCLUDING CAMERA MODULE SHOOTING THROUGH AT LEAST ONE PORTION OF DISPLAY DEVICE

CROSS-REFERENCE TO RELATED APPLICATION

This application is based on and claims priority under 35 U.S.C. § 119 to Korean Patent Application No. 10-2020-0020652, filed on Feb. 19, 2020, in the Korean Intellectual Property Office, the disclosure of which is incorporated by reference herein its entirety.

BACKGROUND

1. Field

The disclosure relates to an electronic device including a camera module that executes shooting through at least part of a display.

The disclosure relates to a method and a device that control a display in an electronic device.

2. Description of Related Art

To provide a wide screen, a portable electronic device such as a smartphone or a tablet PC has increased a display region while minimizing a bezel region. An image sensor constituting a camera (e.g., a camera module), an illumination sensor sensing illumination, a fingerprint recognition sensor performing fingerprint authentication, and the like together with a display device (e.g., a display) are disposed on a front surface of the portable electronic device such as a smartphone or a tablet PC.

The above information is presented as background information only to assist with an understanding of the disclosure. No determination has been made, and no assertion is made, as to whether any of the above might be applicable as prior art with regard to the disclosure.

SUMMARY

To utilize a display region maximally, an image sensor (e.g., a camera module) in an electronic device may be disposed to at least partially overlap with a display device (e.g., a display) up and down. The display device may include an optical hole such that the image sensor is exposed to the outside. A size of the optical hole may be determined depending on physical characteristics of the image sensor. To improve aesthetics of an appearance of the electronic device, the size of the optical hole observed from the outside has decreased gradually. However, when the size of the optical hole observed from the outside is reduced, light leakage may occur incidentally during shooting.

Aspects of the disclosure are to address at least the above-mentioned problems and/or disadvantages and to provide at least the advantages described below. Accordingly, an aspect of the disclosure is to provide an electronic device including a camera module (e.g., a front camera) that executes shooting through a part of the display.

Accordingly, an aspect of the disclosure is to provide an electronic device capable of handling (e.g., minimizing) light leakage during shooting by controlling pixels around a camera exposure region of a display at least partially overlapping with the camera module up and down. Furthermore, an aspect of the disclosure is to provide a method of controlling a display in an electronic device to handle the light leakage during shooting.

In accordance with an aspect of the disclosure, an electronic device may include a camera module including at least one lens, a display including a camera exposure region at least partially overlapping with the lens and a border region surrounding a periphery of the camera exposure region in a direction corresponding to an optical axis of the lens, and a processor operatively connected to the camera module and the display. The processor may be configured to control a luminance of the border region to be within a specified range when a shooting-related application is executed or when the camera module is activated.

In accordance with another aspect of the disclosure, an electronic device may include a camera module including at least one lens, a display including a camera exposure region at least partially overlapping with the lens and a border region surrounding a periphery of the camera exposure region in a direction corresponding to an optical axis of the lens, and a processor operatively connected to the camera module and the display. The processor may be configured to control a luminance of the border region to be within a specified range when the camera module is activated and a specified condition is satisfied.

In accordance with another aspect of the disclosure, an electronic device may include a camera module including at least one lens, a display including a camera exposure region at least partially overlapping with the lens and a border region surrounding a periphery of the camera exposure region in a direction corresponding to an optical axis of the lens, and a processor operatively connected to the camera module and the display. The processor may be configured to control a luminance of the border region to be within a specified range when a first user input is received through the display.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
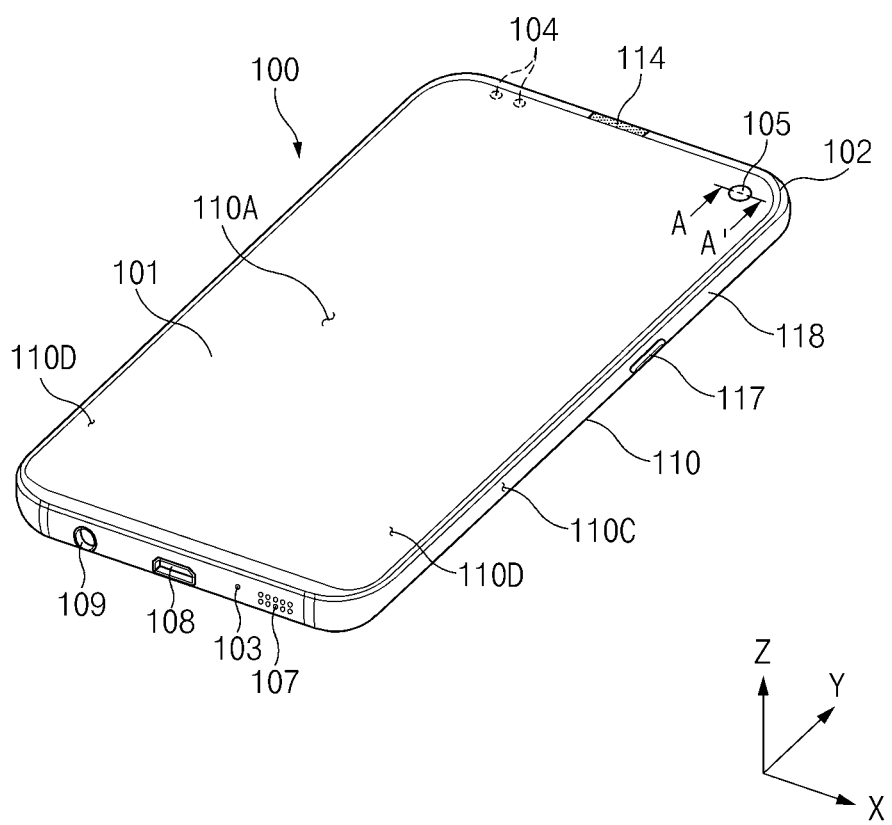
FIG. 1 is a perspective view of a front surface of an electronic device according to an embodiment.
Figure 2:
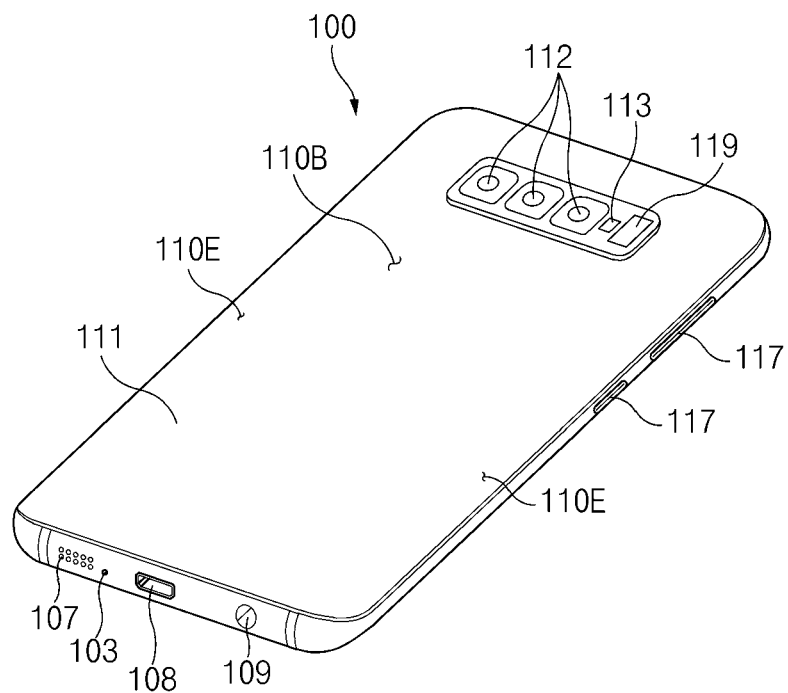
FIG. 2 is a perspective view of a rear surface of an electronic device of FIG. 1 according to various embodiments.

FIG. 1 is a perspective view of a front surface of an electronic device 100 according to an embodiment. FIG. 2 is a perspective view of a rear surface of the electronic device 100 of FIG. 1 according to various embodiments.

Referring to FIGS. 1 and 2, the electronic device 100, according to an embodiment, may include a housing 110 including a first surface (or a front surface) 110A, a second surface (or a rear surface) 110B, and a side surface 110C surrounding a space between the first surface 110A and the second surface 110B. In certain embodiments, the housing 110 may refer to a structure which forms a part of the first surface 110A, the second surface 110B, and the side surfaces 110C in FIG. 1. According to an embodiment, the first surface 110A may be implemented with a front plate 102 (e.g., a glass plate including various coating layers, or a polymer plate), at least part of which is substantially transparent. The second surface 110B may be formed by a rear plate 111 that is substantially opaque. For example, the rear plate 111 may be implemented with a coated or colored glass, a ceramic, a polymer, a metal (e.g., aluminum, stainless steel (STS), or magnesium), or the combination of at least two of the materials. The side surface 110C may be coupled with the front plate 102 or the rear plate 111 and may be implemented with a side bezel structure 118 (or a "side member") including a metal and/or a polymer. In an embodiment, the rear plate 111 and the side bezel structure 118 may be integrally formed and may include the same material (e.g., a metal material such as aluminum).

In certain embodiments, the front plate 102 may include first regions 110D, which are bent toward the rear plate 111 from the first surface 110A so as to be seamlessly extended, at opposite long edges of the front plate 102. In an embodiment that is illustrated in FIG. 2, the rear plate 111 may include second regions 110E, which are bent toward the front plate 102 from the second surface 110B so as to be seamlessly extended, at opposite long edges of the rear plate 111. In an embodiment, the front plate 102 or the rear plate 111 may include only one of the first region 110D or the second region 110E. In an embodiment, the front plate 102 may include only a flat plane disposed parallel to the second surface 110B, without including the first regions 110D and the second regions 110E. In the embodiments, when viewed from a side surface of the electronic device 100, the side bezel structure 118 may have a first thickness (or width) on one side surface where the first regions 110D or the second regions 110E are not included, and may have a second thickness smaller than the first thickness on one side surface where the first regions 110D or the second regions 110E are included.

Figure 12:
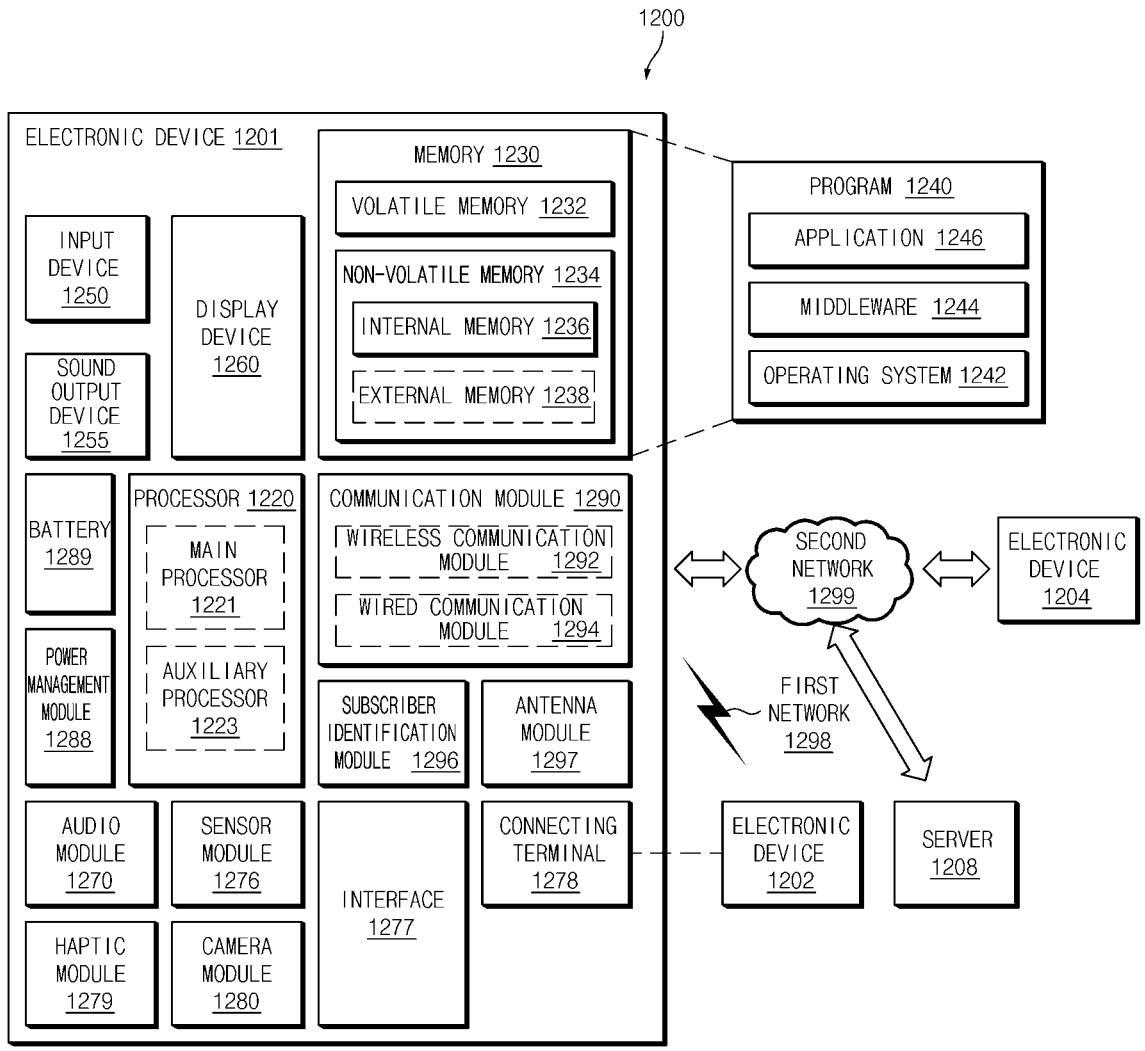
FIG. 12 is a block diagram illustrating an electronic device in a network environment according to various embodiments.

According to an embodiment, the electronic device 100 may include at least one or more of a display 101 (e.g., a display device 1260 of FIG. 12), an input device 103 (e.g., an input device 1250 of FIG. 12), a sound output device 107 or 114 (e.g., a sound output device 1255 of FIG. 12), a sensor module 104 or 119 (e.g., a sensor module 1276 of FIG. 12), a camera module 105 or 112 (e.g., a camera module 1280 of FIG. 12), a key input device 117, an indicator, and a connector 108 or 109 (e.g., a connecting terminal 1278 of FIG. 12). In an embodiment, the electronic device 100 may not include at least one (e.g., the key input device 117 or the indicator) of the components or may further include any other component.

According to an embodiment, the display 101 may be viewable, for example, through an upper portion of the front plate 102. In an embodiment, at least part of the display 101 may be viewable through the front plate 102 forming the first surface 110A and the first regions 110D of the side surface 110C.

According to an embodiment, a corner of the display 101 may be formed to be substantially identical to a shape of an outer portion of the front plate 102, which is adjacent thereto. In certain embodiments, to expand an area where the display 101 is exposed, a gap between an outer portion of the display 101 and an outer portion of the front plate 102 may be formed substantially identically.

According to an embodiment, a surface (or the front plate 102) of the housing 110 may include a screen display region formed as the display 101 is exposed visually. For example, the screen display region may include the first plane 110A and the first regions 110D of the side surface.

According to an embodiment, the screen display regions 110A and 110D of the display 101 may include a region in which at least part of the camera module 105 is capable of being visually distinguished from the display 101. For example, at least part of an edge of a region where the camera module 105 is exposed may be surrounded by the screen display regions 110A and 110D. In various embodiments, the camera module 105 may include a plurality of camera modules (e.g., the camera module 1280 of FIG. 12). In certain embodiments, in an inner space of the electronic device 100, the camera module 105 may be disposed to perform related functions without being visually distinguished (or exposed) from the screen display regions 110A and 110D of the display 101.

In certain embodiments, a recess or an opening may be formed in a part of the screen display regions 110A and 110D of the display 101; the sound output device 114, the sensor module 104 or 119, and/or a light-emitting device, which are aligned with the recess or the opening, may be included in the part of the screen display regions 110A and 110D of the display 101.

In certain embodiments, the display 101 may include the sound output device 114, the sensor module 104, and/or the light-emitting device on the bottom surface of the screen display regions 110A and 110D.

According to an embodiment, the display 101 may be coupled to a touch sensing circuit, a pressure sensor capable of measuring the intensity (or pressure) of a touch, and/or a digitizer capable of detecting a magnetic stylus pen or may be disposed adjacent thereto. In an embodiment, at least part of the sensor modules 104 and 119 and/or at least part of the key input devices 117 may be disposed in the first regions 110D and/or the second regions 110E.

According to an embodiment, the input device 103 may include the microphone 103. In an embodiment, the input device 103 may include a plurality of microphones 103 disposed to detect a direction of sound. The sound output devices 107 and 114 may include speakers 107 and 114. The speakers 107 and 114 may include the external speaker 107 and the receiver 114 for making a call. In an embodiment, the microphone 103, the speakers 107 and 114, and the connectors 108 and 109 may be disposed in the space of the electronic device 100, and may be exposed to external environments through at least one hole formed in the housing 110. In an embodiment, the hole formed in the housing 110 may be used in common for the microphone 103 and the speakers 107 and 114. In an embodiment, the sound output devices 107 and 114 may include a speaker (e.g., a piezo speaker) that is operated while the hole formed in the housing 110 is excluded.

According to an embodiment, the sensor modules 104 and 119 may generate an electrical signal or a data value that corresponds to an internal operation state of the electronic device 100 or corresponds to an external environment state. For example, the sensor modules 104 and 119 may include the first sensor module 104 (e.g., a proximity sensor or an illuminance sensor) and/or a second sensor module (e.g., a fingerprint sensor) disposed on the first surface 110A of the housing 110, and/or the third sensor module 119 (e.g., a HRM sensor) disposed on the second surface 110B of the housing 110. The fingerprint sensor may be disposed on the first surface 110A (e.g., a home key button) of the housing 110, in a partial region of the second surface 110B, or under the display 101. The electronic device 100 may further include a sensor module, for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, or a humidity sensor. According to an embodiment, the camera modules 105 and 112 may include the first camera module 105 positioned on the first surface 110A of the electronic device 100, and the second camera module 112 and/or a flash 113, which is positioned on the second surface 110B. The camera modules 105 and 112 may include one or plural lenses, an image sensor, and/or an image signal processor. The flash 113 may include, for example, a light-emitting diode or a xenon lamp. In an embodiment, two or more lenses (e.g., a wide-angle lens, an ultra-wide lens, or a telephoto lens) and image sensors may be positioned on one surface of the electronic device 100.

In an embodiment, the first camera module 105 may be formed to correspond to the screen display regions 110A and 110D of the display 101. For example, when viewed in a first direction (e.g., Z-axis direction), the first camera module 105 may be disposed to at least partially overlap with the screen display regions 110A and 110D of the display 101 and may be exposed to a partial region of the screen display regions 110A and 110D. For example, the partial region of the screen display regions 110A and 110D may be a camera exposure region, and the electronic device 100 may control pixels (e.g., pixels around the camera exposure region) of the display 101 corresponding to the camera exposure region.

According to an embodiment, the electronic device 100 may include a plurality of camera modules (e.g., a dual camera or a triple camera), which respectively have different attributes (e.g., an angle of view) or functions. For example, the plurality of camera modules 105 and 112 including lenses having different viewing angles may be present. Under control of the electronic device 100, the viewing angles of the camera modules 105 and 112 performed by the electronic device 100 may be changed based on a user's selection. For example, at least one of the plurality of camera modules 105 and 112 may be a wide-angle camera, and at least the other may be a telephoto camera. Similarly, at least one of the plurality of camera modules 105 and 112 may be a front camera, and at least the other may be a rear camera. Furthermore, the plurality of camera modules 105 and 112 may include at least one of a wide-angle camera, a telephoto camera, and an infrared (IR) camera (e.g., a time of flight (TOF) camera or a structured light camera). According to an embodiment, the IR camera may be operated as at least part of a sensor module (e.g., the sensor module 1276 in FIG. 12). For example, the TOF camera may be operated as at least part of the sensor module (e.g., the sensor module 1276 of FIG. 12) for detecting a distance to a subject.

According to an embodiment, the key input device 117 may be disposed on the side surface 110C of the housing 110. In certain embodiments, the electronic device 100 may not include all or part of the above-described key input devices 117 and the key input device not included may be implemented on the display 101 in the form of a soft key. In certain embodiments, the key input device 117 may be implemented by using a pressure sensor (e.g., the sensor module 1276 of FIG. 12) included in the display 101.

According to an embodiment, the indicator may be positioned, for example, on the first surface 110A of the housing 110. For example, the indicator may provide state information of the electronic device 100 in a form of light (e.g., a light-emitting device). In certain embodiments, the light-emitting device may provide, for example, a light source operating in conjunction with an operation of the camera module 105 or 112. For example, the indicator may include a light-emitting diode (LED), an IR LED, and a xenon lamp.

In an embodiment, the connector holes 108 and 109 may include the first connector hole 108 capable of accommodating a connector (e.g., a USB connector) for transmitting/receiving power and/or data with an external electronic device and/or the second connector hole (or an earphone jack) 109 capable of accommodating a connector for transmitting/receiving an audio signal with the external electronic device.

In an embodiment, the camera module 105 of the camera modules 105 and 112, the sensor module 104 of the sensor modules 104 and 119, and/or the indicator may be disposed to be viewable through the display 101. For example, the camera module 105, the sensor module 104, and/or the indicator may be disposed to contact the external environment through a transparent region of the front plate 102 of the display 101 in the inner space of the electronic device 100. In certain embodiments, the sensor modules 104 may be disposed to perform the function of the sensor modules 104 without being visually exposed through the front plate 102 in the inner space of the electronic device.

Figure 3:
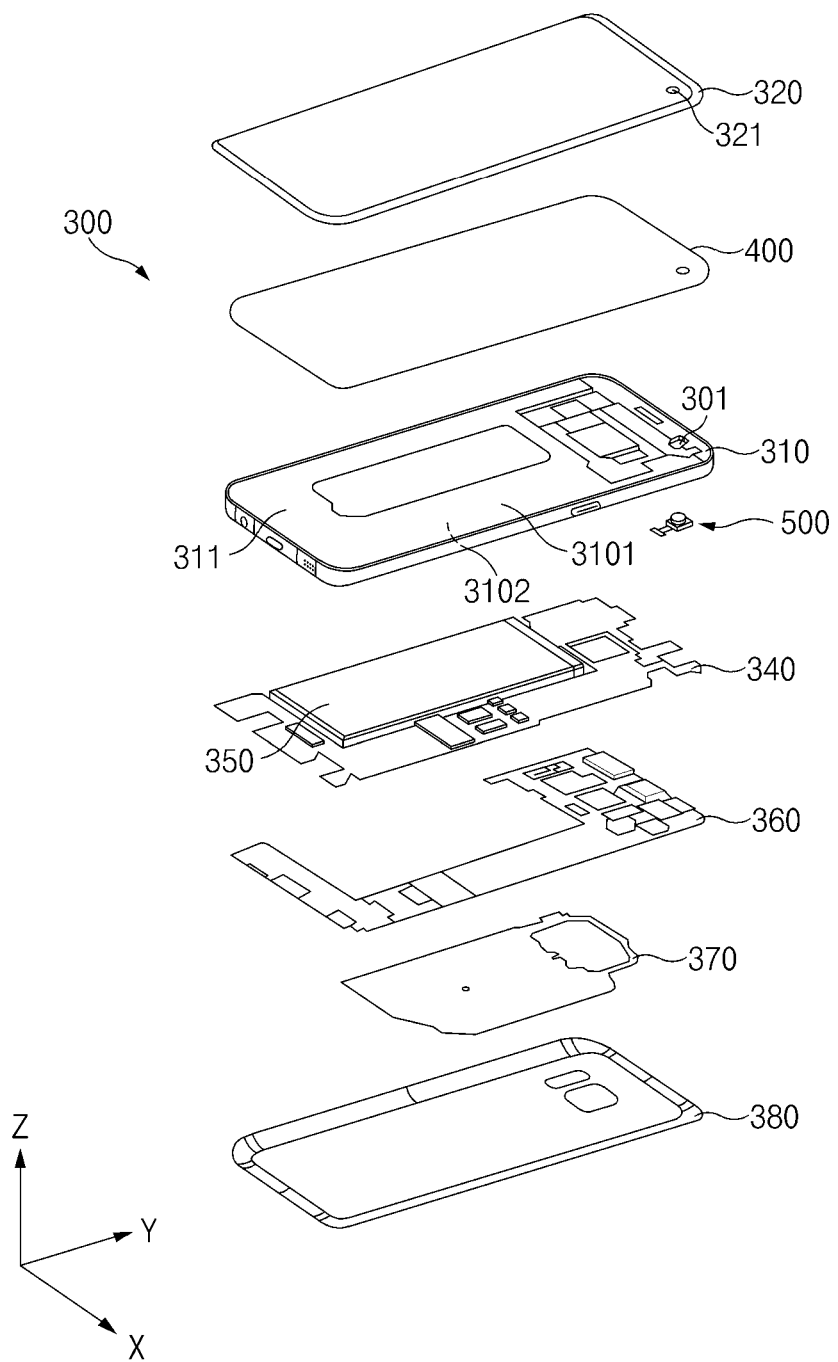
FIG. 3 is an exploded perspective view of the electronic device of FIG. 1 according to various embodiments.

FIG. 3 is an exploded perspective view of the electronic device of FIG. 1 according to various embodiments.

An electronic device 300 of FIG. 3 may be at least partially similar to the electronic device 100 of FIGS. 1 and 2, or may further include another embodiment of the electronic device.

Referring to FIG. 3, in an embodiment, the electronic device 300 (e.g., the electronic device 100 of FIG. 1 or 2) may include a side member 310 (e.g., the side bezel structure 118), a first support member 311 (e.g., a bracket or a support structure), a front plate 320 (e.g., a front cover), a display 400, a printed circuit board (PCB) 340 (e.g., a PCB, a flexible PCB (FPCB), or a rigid flexible PCB (RFPCB)), a battery 350, a second support member 360 (e.g., a rear case), an antenna 370, and a rear plate 380 (e.g., a rear cover). In an embodiment, the electronic device 300 may not include at least one (e.g., the first support member 311 or the second support member 360) of the components or may further include any other component. At least one of the components of the electronic device 300 may be identical or similar to at least one of the components of the electronic device 100 of FIG. 1 or 2, and thus, additional description will be omitted to avoid redundancy.

In an embodiment, the first support member 311 may be positioned within the electronic device 300 and may be connected with the side member 310, or may be integrally formed with the side member 310. For example, the first support member 311 may be formed of a metal material and/or a nonmetal material (e.g., polymer). The display 400 may be coupled to one surface of the first support member 311, and the printed circuit board 340 may be coupled to the opposite surface of the first support member 311. A processor, a memory, and/or an interface may be mounted on the printed circuit board 340. For example, the processor may include one or more of a central processing unit, an application processor, a graphic processing device, an image signal processor, a sensor hub processor, or a communication processor.

In an embodiment, the memory may include, for example, a volatile memory or a nonvolatile memory.

In an embodiment, the interface may include, for example, a high definition multimedia interface (HDMI), a universal serial bus (USB) interface, a secure digital (SD) card interface, and/or an audio interface. The interface may electrically or physically connect, for example, the electronic device 300 with an external electronic device and may include a USB connector, an SD card/MMC connector, or an audio connector.

In an embodiment, the battery 350 that is a device for supplying power to at least one component of the electronic device 300 may include, for example, a primary cell incapable of being recharged, a secondary cell rechargeable, or a fuel cell. For example, at least part of the battery 350 may be disposed on substantially the same plane as the printed circuit board 340. The battery 350 may be integrally installed inside the electronic device 300. In certain embodiments, the battery 350 may be disposed to be removable from the electronic device 300.

In an embodiment, the antenna 370 may be interposed between the rear plate 380 and the battery 350. The antenna 370 may include, for example, a near field communication (NFC) antenna, an antenna for wireless charging, and/or a magnetic secure transmission (MST) antenna. For example, the antenna 370 may perform short range communication with an external device or may wirelessly transmit/receive power necessary for charging. In certain embodiments, an antenna structure may be implemented with a part of the side bezel structure 310 and/or the first support member 311, or with a combination thereof.

According to various embodiments, the first support member 311 of the side member 310 may include a first surface 3101 facing the front plate 320 and a second surface 3102 facing a direction (e.g., a direction of a rear plate) opposite to the first surface 3101. According to certain embodiments, a camera module 500 (e.g., the camera module 105 of FIG. 1) may be interposed between the first support member 311 and the rear plate 380. According to certain embodiments, the camera module 500 may be disposed to protrude or to be viewable, in a direction of the front plate 320 through a through-hole 301 connected from the first surface 3101 of the first support member 311 to the second surface 3102 of the first support member 311. According to an embodiment, a portion of the camera module 500 protruding through the through-hole 301 may be disposed at a location corresponding to a transparent region of the display 400 so as to be close to a bottom surface of the display 400. In certain embodiments, when the camera module 500 is interposed between the display 400 and the first support member 311, the through-hole 301 may be unnecessary. According to an embodiment, a camera exposure region 321 may include a transparent region (e.g., a transparent region 321a of FIG. 5) substantially facing an effective region of a lens (e.g., a lens 531 of FIG. 5) of the camera module 500 and/or an opaque region (e.g., an opaque region 321b in FIG. 5) having a predetermined width and surrounding the transparent region.

Figure 4:
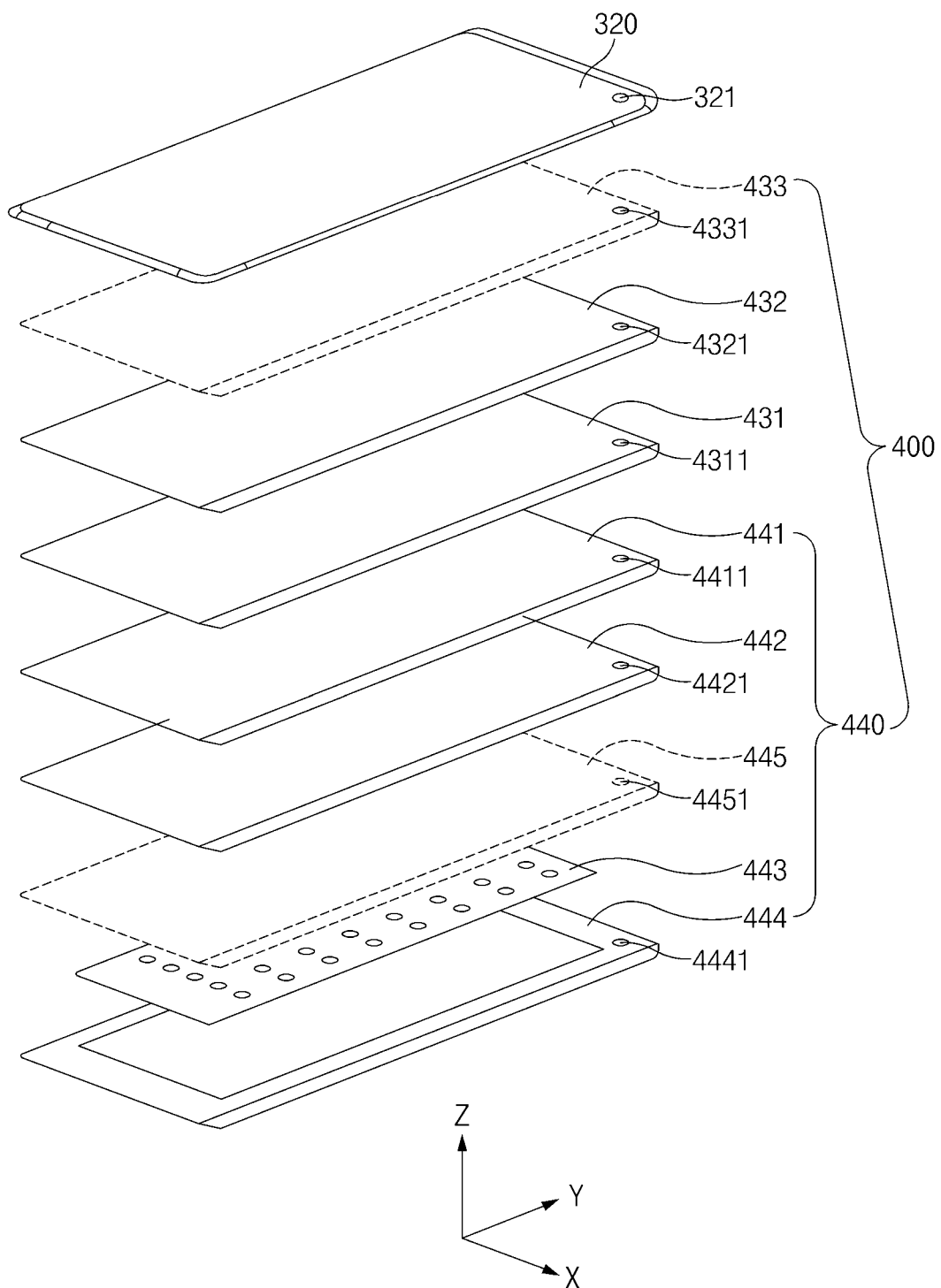
FIG. 4 is an exploded perspective view of a display according to various embodiments.
Figure 5:
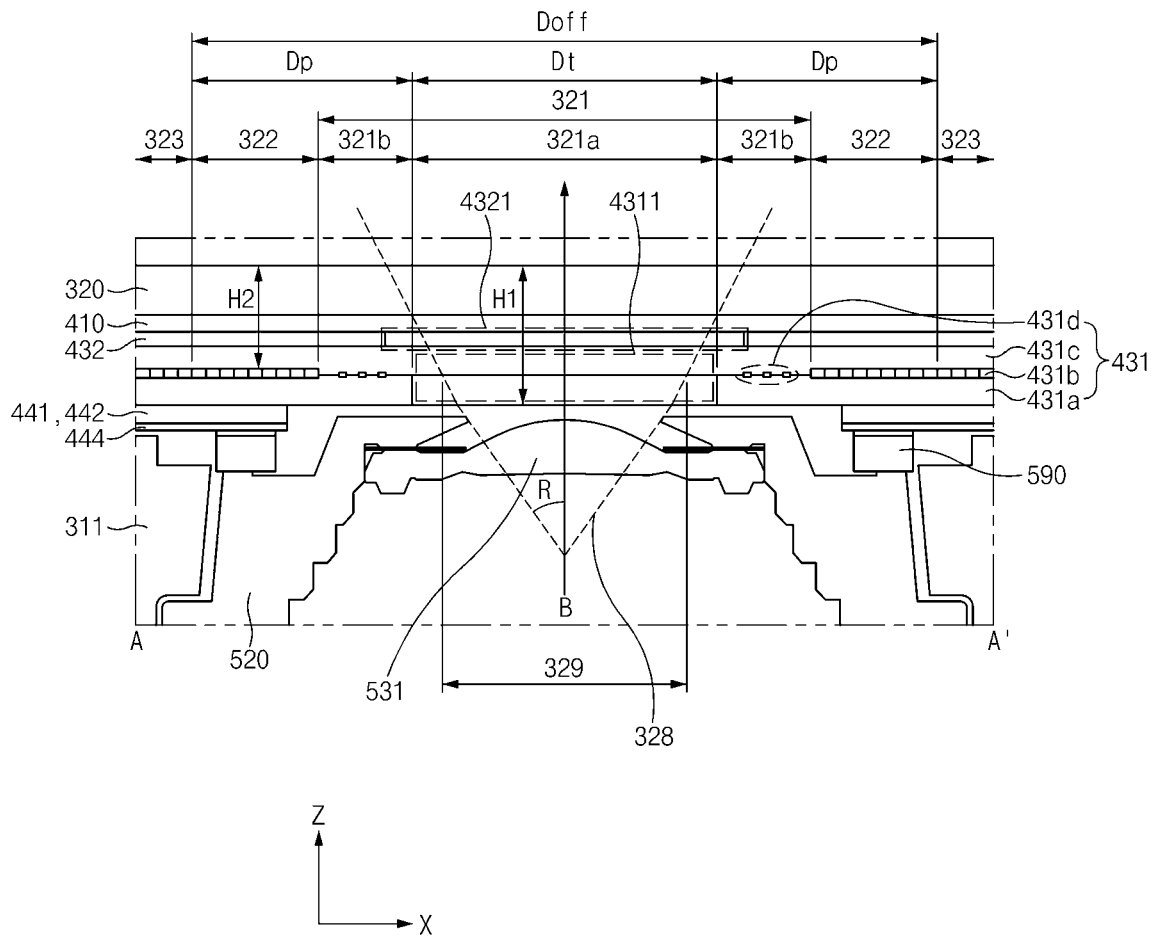
FIG. 5 is a partial cross-sectional view of an electronic device viewed from line A-A' of FIG. 1 according to various embodiments.

FIG. 4 is an exploded perspective view of a display according to various embodiments. The display 400 of FIG. 4 may be at least partially similar to the display 101 of FIG. 1 or may further include another embodiment of the display. FIG. 5 is a partial cross-sectional view of an electronic device viewed from line A-A' of FIG. 1 according to various embodiments.

Referring to FIGS. 4 and 5, the display 400 may include a display panel 431 including a polarizing film 432 (e.g., a polarizer (POL)) disposed on a bottom surface of the front plate 320 (e.g., a front cover, a glass plate, or a cover member) through an adhesive member 410 and at least one subsidiary material layer 440 attached to a bottom surface of the display panel 431. For example, the adhesive member 410 may include an optical clear adhesive (OCA), a pressure sensitive adhesive (PSA), a heat-reactive adhesive, a general adhesive and/or a double-sided tape. In various embodiments, the display panel 431 and the polarizing film 432 may be integrated with each other.

According to an embodiment, the display panel 431 may include a display substrate 431a, pixels 431b formed on the display substrate 431a, and a pixel protective layer 431c. For example, the pixels 431b may not be disposed in the camera exposure region 321. Wires 431d may be disposed in the opaque region 321b of the camera exposure region 321 without pixels. According to an embodiment, the pixels 431b may be formed in a grid structure, but are not limited thereto. For example, the pixels 431b may be formed in various shapes. According to an embodiment, the pixel protective layer 431c may include encapsulation glass. According to an embodiment, the display substrate 431a may include low temperature polycrystalline silicon (LTPS) glass. The pixels 431b may include a thin film transistor (TFT) formed on the LTPS glass.

According to an embodiment, the display 400 may include a control circuit. For example, the control circuit may include a flexible printed circuit board (FPCB), which electrically connects a main printed circuit board (e.g., the printed circuit board 340 of FIG. 3) of an electronic device (e.g., the electronic device 300 of FIG. 3) to the display panel 431 and a display driver IC (DDI) mounted on the FPCB. For example, the display 400 may additionally include a touch panel 433. When the display 400 operates as a touch display in an in-cell scheme or an on-cell scheme depending on an arrangement location of the touch panel 433, the control circuit may include a touch display driver IC (TDDI). For another example, the display 400 may include a fingerprint sensor disposed at a periphery of the control circuit. The fingerprint sensor may include an ultrasonic or optical fingerprint sensor capable of recognizing a finger's fingerprint, which is contacted or approached from the outer surface of the front plate 320 through a hole at least partially formed in a part of the components of the display 400.

According to an embodiment, the at least one subsidiary material layer 440 may include at least one polymer member 441 or 442 disposed on the bottom surface of the display panel 431, at least one functional member 443 disposed on the bottom surface of the at least one polymer member 441 or 442, or a conductive member 444 disposed on the bottom surface of the at least one functional member 443. For example, the at least one polymer member 441 or 442 may include a light-shielding layer 441 (e.g., a black layer including uneven patterns) for removing air bubbles to be generated between the display panel 431 and attachments disposed under the display panel 431 and blocking light incident from the outside and/or a cushioning layer 442 (e.g., a sponge layer) disposed to alleviate impacts. For example, the at least one functional member 443 may include a graphite sheet for heat dissipation, an added display, a force touch FPCB, a fingerprint sensor FPCB, an antenna radiator for communication, a heat radiation sheet, a conductive/non-conductive tape, or an open cell sponge. For example, the conductive member 444 may be a metal plate, and may be used to help the rigidity of an electronic device (e.g., the electronic device 300 of FIG. 3), to shield ambient noise, and to dissipate heat radiated from surrounding heat dissipating parts. For example, the conductive member 444 may include Cu, Al, SUS, or CLAD (e.g., a stacked member in which SUS and Al are disposed alternately). For another example, the display 400 may further include a detection member 445 for detecting an input by a writing member (e.g., an electronic pen) in an electromagnetic induction scheme. The detection member 445 may include a digitizer. For example, the detection member 445 may be interposed between the at least one polymer member 442 and the functional member 443. For another example, the detection member 445 may be interposed between the display panel 431 and the at least one polymer member 441.

According to an embodiment, when viewed in a first direction (e.g., Z-axis direction), the front plate 320 may include the camera exposure region 321 at least partially formed in a region overlapping with the display panel 431. For example, when the front plate 320 is viewed in the first direction, the display panel 431 may include an optical hole 4311 formed in a region overlapping with the camera exposure region 321. For example, an optical hole may mean a region through which light passes regardless of a material composition in a specific region. For example, the optical hole 4311 may be disposed to at least partially overlap with optical holes 4321 and 4331 formed in the polarizing film 432 attached to the display panel 431 and/or the touch panel 433. The optical hole 4321 may be disposed to at least partially overlap with an optical hole formed in the adhesive member 410 for attaching the polarizing film 432 or the touch panel 433 to the front plate 320. When the front plate 320 is viewed in the first direction, the at least one subsidiary material layer 440 may include optical holes 4411, 4421, 4441, and 4451 formed to at least partially overlap the camera exposure region 321. For another example, the optical holes 4411, 4421, 4441, and 4451 may form a physical hole. According to an embodiment, at least partially overlapping portions of the optical holes 4311, 4321, 4331, 4411, 4421, 4441, and 4451 may correspond to the transparent region 321a.

According to an embodiment, the optical hole 4321 formed in at least part of the polarizing film 432 may be formed to be larger than the optical hole 4311 formed in at least part of the display panel 431. For example, the sizes or shapes of the optical holes 4311 and 4321 may be determined by a angle of view 328 of a camera module (e.g., the camera module 500 of FIG. 3). For example, in consideration of the angle of view 328 of the camera module (e.g., the camera module 500 of FIG. 3), the optical hole 4311 formed in a layer (e.g., the display panel 431) close to the lens 531 of the camera module (e.g., the camera module 500 of FIG. 3) may be formed in a smaller shape than the optical hole 4321 formed in a layer (e.g., the polarizing film 432) remote from the lens 531.

According to an embodiment, the front plate 320 may include the camera exposure region 321 disposed at a location corresponding to a camera module (e.g., the camera module 500 of FIG. 3). For example, the camera exposure region 321 may be determined by the transparent region 321a and the opaque region 321b (e.g., a wire region) disposed to surround the periphery of the transparent region 321a. For example, the sizes or shapes of the transparent region 321a and the opaque region 321b may be determined by the angle of view 328 of the camera module (e.g., the camera module 500 of FIG. 3).

According to an embodiment, the camera module (e.g., the camera module 500 of FIG. 3) may include the at least one lens 531 and a camera housing 520. For example, the lens 531 may be disposed in a center part of the camera housing 520. The center of the lens 531 may correspond to an optical axis B. The angle of view 328 of the lens 531 may be formed around the optical axis B. A half-angle of view R may be defined as an angle (e.g., half of the angle of view 328) between the optical axis B and the angle of view 328. According to various embodiments, a cushioning member 590 (e.g., sponge) may be interposed between the camera housing 520 and the conductive member 444. The cushioning member 590 may alleviate impacts between the camera housing 520 and the display panel 431.

According to an embodiment, the camera module (e.g., the camera module 500 of FIG. 3) (e.g., a front camera) faces substantially the same direction as the display 400. Accordingly, when a camera shoots an image, the light generated by some pixels close to the camera exposure region 321 may be at least partially reflected on the front plate 320 and then may be incident into an angle-of-view region 329 of the camera module 500. When the light generated by the pixel of the display 400 is incident into the angle-of-view region 329, light leakage (e.g., a phenomenon that a bright strip shape appears on an image when a camera shoots the image) may occur in the image obtained by the camera module (e.g., the camera module 500 of FIG. 3). A processor (e.g., a processor 1220 of FIG. 12) of an electronic device (e.g., the electronic device 300 of FIG. 3) may prevent (or reduce) the light leakage by controlling (e.g., deactivating or activating in black) luminances of pixels in a border region 322 to be less than a specified value (e.g., 1 nit).

According to an embodiment, the size of the border region 322 for preventing the light leakage may be determined by characteristics of the front plate 320, the display panel 431 and/or the lens 531. For example, a diameter Doff including the border region 322 and the camera exposure region 321 may be represented as Equation 1 below.

$$Doff = 2Dp + Dt$$

$$Dp = (H1 + H2) * \tan \alpha$$

$$\alpha = \sin^{-1}(\sin R/n) \quad \text{Equation 1}$$

In Equation 1, Dp may denote a distance obtained by summing a width of the border region 322 and a width of the opaque region 321b; Dt may denote a width of the transparent region 321a; H1 may denote a thickness from the top surface of the front plate 320 to the bottom surface of the display panel 431; H2 may denote a thickness from the top surface of the front plate 320 to the pixels 431b; R may denote a half-angle of view of the lens 531; and, n may denote a refractive index (e.g., 1.49) of the front plate 320. Based on Equation 1, the size of the border region 322 may be determined by a thickness of the front plate 320, a thickness of the display panel 431, the refractive index R of the front plate 320, and/or the angle of view 328 of the lens 531.

According to an embodiment, a center of the diameter Doff including the border region 322 and the camera exposure region 321 may substantially correspond to the optical axis B of the lens 531.

Figure 6A:
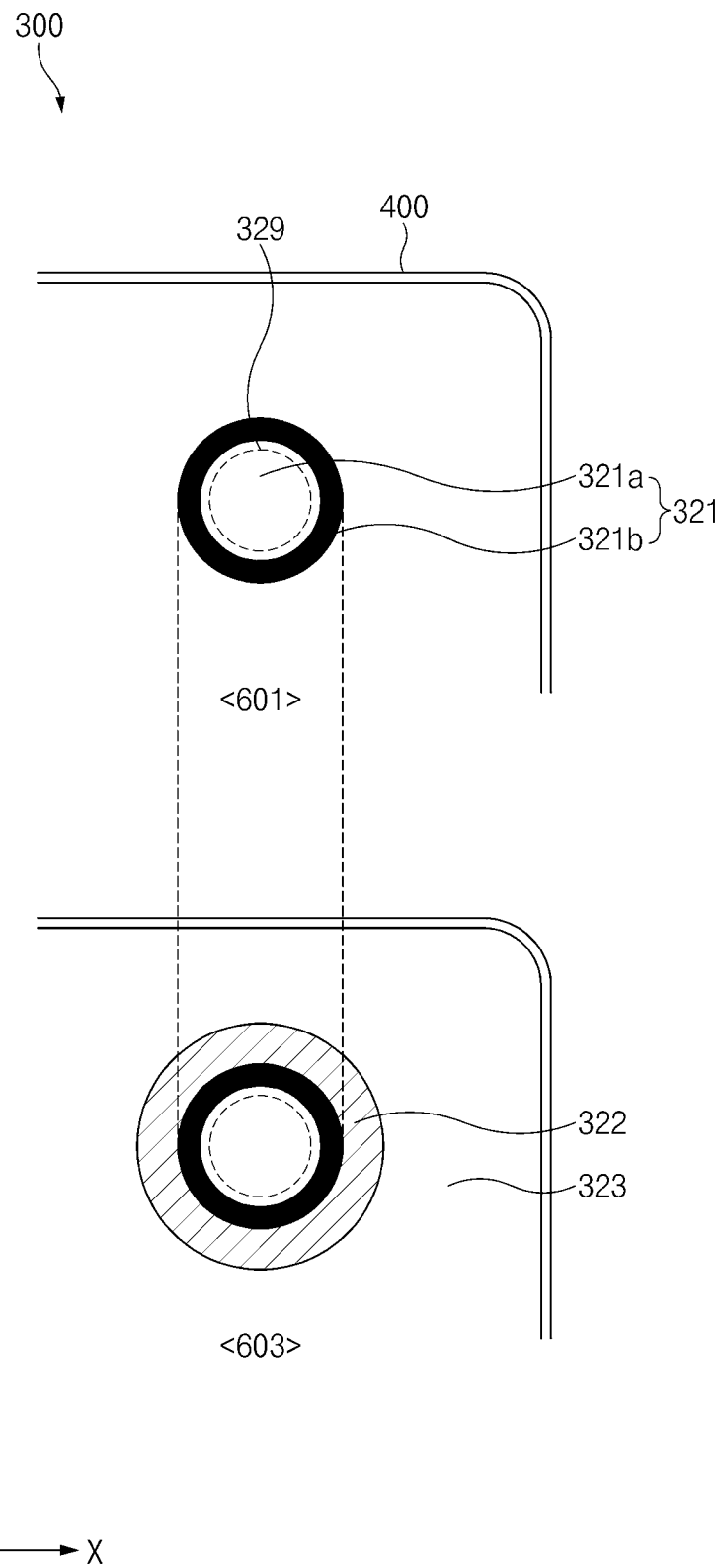
FIG. 6A is a diagram illustrating an example of a border region set for an electronic device according to an embodiment.

According to an embodiment, the border region 322 may be disposed to surround a periphery of the camera exposure region 321. For example, the border region 322 may include a part of the pixels 431b. The processor (e.g., the processor 1220 of FIG. 12 to be described later) of the electronic device (e.g., the electronic device 300 of FIG. 3) may control the pixels of the border region 322 independently of the pixels of a normal region 323. For example, when a specified condition (e.g., a camera module (e.g., the camera module 500 in FIG. 3)) is activated, when a camera module (e.g., the camera module 500 of FIG. 3) shoots an image by using a flash (e.g., the flash 113 of FIG. 2), when the camera module (e.g., the camera module 500 of FIG. 3) shoots an image in a low illumination (or extremely low illumination) state, or when an image is displayed (e.g., full-angle of view shooting) through at least part of the display 400 (e.g., a periphery of the camera exposure region 321) in a state where the camera module (e.g., the camera module 500 in FIG. 3) is activated, the processor (e.g., the processor 1220 of FIG. 12) of the electronic device (e.g., the electronic device 300 of FIG. 3) may control luminances of pixels corresponding to the border region 322. For example, the processor (e.g., the processor 1220 of FIG. 12) may control luminances of pixels corresponding to the border region 322 to be less than a specified value (e.g., 1 nit). FIG. 6A is a diagram illustrating an example of a border region set for an electronic device according to an embodiment. For example, the electronic device 300 may set and control the one border region 322 on the display 400. In an embodiment, at least one of the components of the electronic device 300 may be the same as or similar to at least one of components of the electronic devices 100 and 300 of FIGS. 1 to 3, and/or the front plate 320 of FIGS. 4 to 5, and components of the display 400, and thus, additional description will be omitted to avoid redundancy.

Referring to FIGS. 5 and 6A, the processor (e.g., the processor 1220 of FIG. 12 to be described later) of the electronic device 300 may set the border region 322 on the display 400 to surround a periphery of the camera exposure region 321. For example, the display 400 may include the border region 322 and the normal region 323. The processor may distinguish pixels corresponding to the border region 322 and pixels corresponding to the normal region 323 and may operate the pixels corresponding to the border region 322 and the pixels corresponding to the normal region 323.

According to an embodiment, the camera module (e.g., the camera module 500 of FIG. 3) (e.g., a front camera) faces substantially the same direction as the display 400. Accordingly, when a camera shoots an image, the light generated by some pixels close to the camera exposure region 321 may be at least partially reflected on the front plate 320 and then may be incident into the angle-of-view region 329 of the camera module 500. When the light generated by the pixel of the display 400 is incident into the angle-of-view region 329, light leakage (e.g., a phenomenon that a bright strip shape appears on an image when a camera shoots the image) may occur in the image obtained by the camera module 500. The processor may prevent (or reduce) the light leakage by controlling (e.g., deactivating or activating in black) luminances of pixels in the border region 322 to be less than a specified value (e.g., 1 nit).

According to an embodiment, in a first state 601, the processor may control pixels of the border region 322 so as to be continuous with pixels of the normal region 323, based on an image being displayed by the pixels in the normal region 323. For example, the display 400 may display substantially the same image in the border region 322 and the normal region 323. For example, the first state 601 may include a case where the camera module 500 is deactivated or a case where pixels in the border region 322 and the normal region 323 surrounding the border region 322 display a dark color (e.g., black) (e.g., a case where a captured screen is displayed in only the partial region of the display 400 in a state where the camera module 500 is activated).

According to an embodiment, in a second state 603, the processor may display an image, which is different from an image displayed in pixels in the normal region 323, in pixels in the border region 322. For example, the processor may control luminances of pixels in the border region 322 to be less than a specified value. For example, the processor may deactivate pixels in the border region 322. For another example, the processor may display pixels in the border region 322 in a dark color (e.g., black). For example, the second state 603 may include a case where the camera module 500 is activated, a case where the camera module 500 shoots an image by using a flash, a case where the camera module 500 shoots an image in an extremely low illuminance state, or a case where an image is displayed (e.g., full-angle of view shooting) through at least part of the display 400 in a state where the camera module 500 is activated.

Figure 6B:
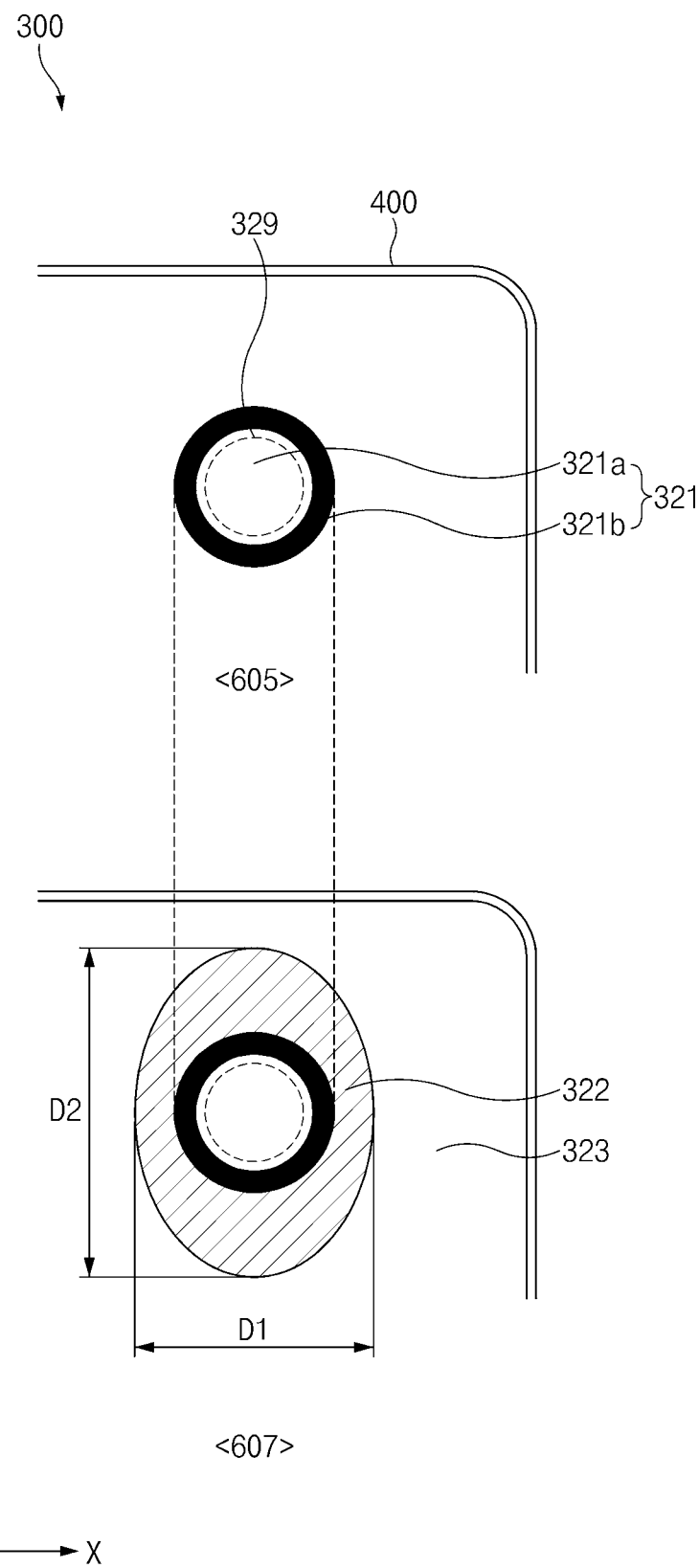
FIG. 6B is a diagram illustrating another example of a border region set for an electronic device according to various embodiments.

FIG. 6B is a diagram illustrating another example of a border region set for an electronic device according to various embodiments. For example, the electronic device 300 may set and control one border region on the display 400. Outer portions of the border region 322 may be set to have different distances from the camera exposure region 321. In an embodiment, at least one of the components of the electronic device 300 may be the same as or similar to at least one of components of the electronic devices 100 and 300 of FIGS. 1 to 3, and/or the front plate 320 of FIGS. 4 to 5, and components of the display 400, and thus, additional description will be omitted to avoid redundancy.

Referring to FIGS. 5 and 6B, a processor (e.g., the processor 1220 of FIG. 12 to be described later) of the electronic device 300 may set the border region 322 on the display 400 so as to surround a periphery of the camera exposure region 321. For example, the display 400 may include the border region 322 and the normal region 323. The processor may distinguish pixels corresponding to the border region 322 and pixels corresponding to the normal region 323 and may operate the pixels corresponding to the border region 322 and the pixels corresponding to the normal region 323.

According to an embodiment, in a third state 605, the processor may control the pixels of the border region 322 so as to be continuous with the pixels of the normal region 323, based on the image being displayed in the pixels in the normal region 323. An operation of the processor in the third state 605 may be the same as or similar to an operation of the processor in the first state 601 of FIG. 6A. Accordingly, descriptions about the operation of the processor in the third state 605 are omitted.

According to an embodiment, in a fourth state 607, the processor may display an image, which is different from an image displayed in pixels in the normal region 323, in pixels in the border region 322. An operation of the processor in the fourth state 607 may be at least partially the same as or similar to an operation of the processor in the second state 603 of FIG. 6A. Accordingly, descriptions about the operation of the processor the same as or similar to the second state 603 of FIG. 6A are omitted. According to an embodiment, the processor set the border region 322 such that outer portions of the border region 322 respectively have different distances from the camera exposure region 321. Alternatively, the processor may differently assign the size (alternatively, a thickness or a width) of the border region 322 for respective directions (e.g., X-axis direction or Y-axis direction), which are different from one another, with the center at the camera exposure region 321. For example, the border region 322 may be set to have a larger size in Y-axis direction than a size in X-axis direction. The border region 322 may have an ellipse shape. For example, the border region 322 may have a diameter of a first length D1 in X-axis direction. The border region 322 may have a diameter of a second length D2 in Y-axis direction. The second length D2 may be set to be larger than the first length D1. For another example, the border region 322 may have a larger size in X-axis direction than a size in Y-axis direction. According to various embodiments, the shape of the border region 322 is not limited to an ellipse. For example, the border region 322 may have various shapes (e.g., a rectangular shape or a hexagonal shape).

Figure 7:
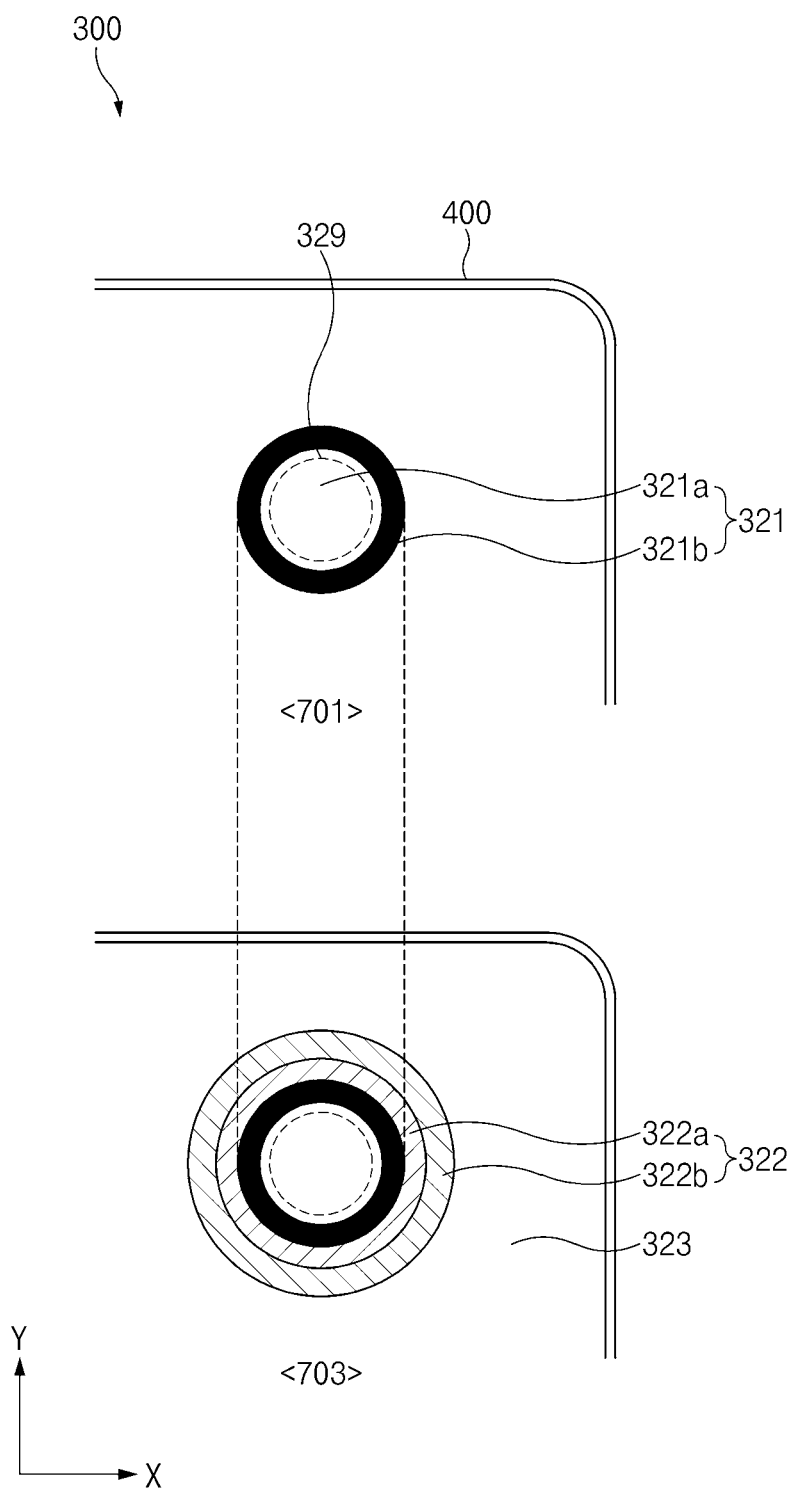
FIG. 7 is a diagram illustrating still another example of a border region set for an electronic device according to various embodiments.

FIG. 7 is a diagram illustrating still another example of a border region set for an electronic device according to various embodiments. For example, the electronic device 300 may set and control a plurality of border regions on the display 400. In an embodiment, at least one of the components of the electronic device 300 may be the same as or similar to at least one of components of the electronic devices 100 and 300 of FIGS. 1 to 3, and/or the front plate 320 of FIGS. 4 to 5, and components of the display 400, and thus, additional description will be omitted to avoid redundancy.

Referring to FIGS. 5 and 7, the processor (e.g., the processor 1220 of FIG. 12 to be described later) of the electronic device 300 may set the border region 322 on the display 400 so as to surround a periphery of the camera exposure region 321. For example, the display 400 may include the border region 322 and the normal region 323. The processor may distinguish pixels corresponding to the border region 322 and pixels corresponding to the normal region 323 and may operate the pixels corresponding to the border region 322 and the pixels corresponding to the normal region 323.

According to an embodiment, the processor may divide and control pixels corresponding to the border region 322 into a plurality of portions depending on conditions. For example, an intensity at which light leakage occurs may vary depending on shooting conditions of a camera module (e.g., the camera module 500 of FIG. 3). For example, when the intensity of the light leakage is not greater than a specified value, the processor may set the size of the border region 322 to be equal to or less than a specified size. When the intensity of the light leakage is greater than the specified value, the processor may set the size of the border region 322 to be greater than the specified size.

According to an embodiment, in a first state 701, the processor may control pixels of the border region 322 so as to be continuous with pixels of the normal region 323, based on an image being displayed in the pixels in the normal region 323. An operation of the processor in the first state 701 may be the same as or similar to an operation of the processor in the first state 601 of FIG. 6A. Accordingly, descriptions about the operation of the processor in the first state 701 are omitted.

According to an embodiment, in a second state 703, the processor may divide and control the pixels in the border region 322 into a plurality of sub-regions depending on shooting conditions of the camera module (e.g., the camera module 500 of FIG. 3). For example, the processor may control luminances of pixels in the border region 322 to be less than a specified value (e.g., 1 nit). For example, the processor may deactivate pixels in the border region 322. For another example, the processor may display pixels in the border region 322 in a dark color (e.g., black). For example, the processor may control corresponding pixels by subdividing the border region 322 into a first sub-border region 322*a* and a second sub-border region 322*b*. In one of a case where a first shooting condition (e.g., a camera module (e.g., the camera module 500 of FIG. 3)) is activated, a case where the camera module (e.g., the camera module 500 of FIG. 3) shoots an image by using a flash, a case where the camera module (e.g., the camera module 500 of FIG. 3) shoots an image in a low illumination (or extremely low illumination) state, or a case where an image is displayed (e.g., the full-angle of view shooting) through at least part of the display 400 in a state where the camera module (e.g., the camera module 500 of FIG. 3) is activated, the processor may control (e.g., deactivating or displaying in a dark color) luminances of pixels in the first sub-border region 322*a* to be less than a specified value (e.g., 1 nit). In one of a case where a second shooting condition (e.g., a camera module (e.g., the camera module 500 of FIG. 3)) is activated, a case where the camera module (e.g., the camera module 500 of FIG. 3) shoots an image by using a flash, a case where the camera module (e.g., the camera module 500 of FIG. 3) shoots an image in a low illumination (or extremely low illumination) state, or a case where an image is displayed (e.g., the full-angle of view shooting) through at least part of the display 400 in a state where the camera module (e.g., the camera module 500 of FIG. 3) is activated, the processor may control (e.g., deactivating or displaying in a dark color) luminances of pixels in the border region 322 (or both the first sub-border region 322*a* and the second sub-border region 322*b*) to be less than the specified value (e.g., 1 nit). An embodiment in which the border region 322 is divided into two sub-border regions is illustrated in FIG. 7 by way of an example. However, the number of detailed divisions of the border region 322 is not limited thereto. For example, the processor may divide the border region 322 into a plurality of sub-border regions and may control corresponding pixels depending on shooting conditions.

Figure 8:
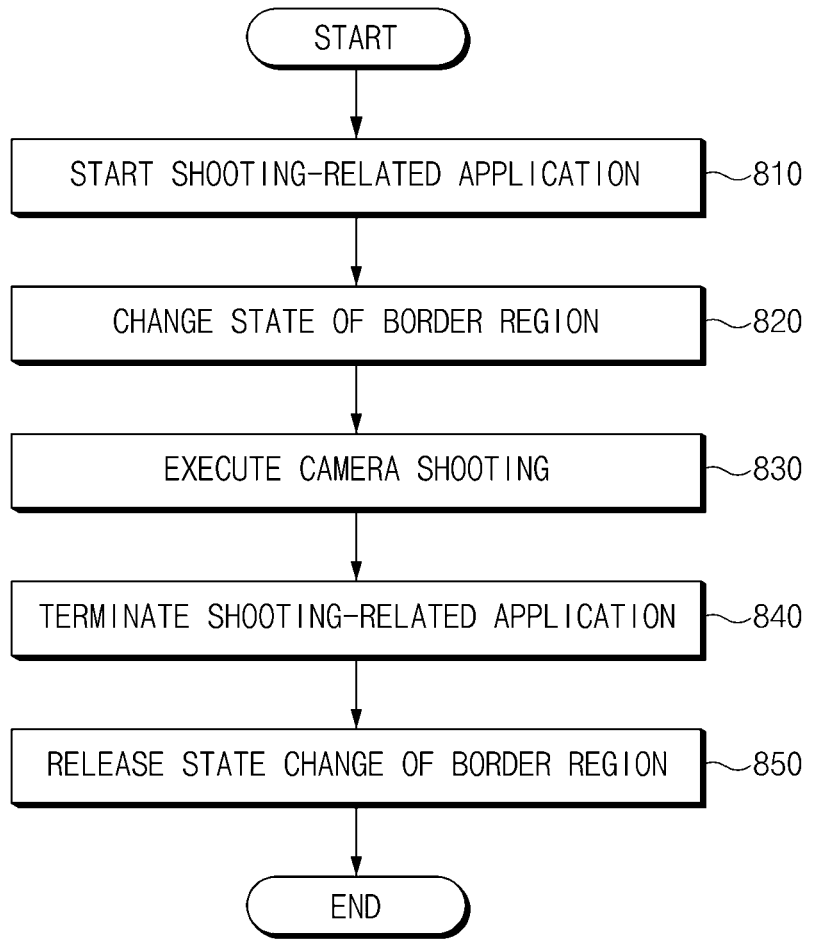
FIG. 8 is a flowchart illustrating an example of a method of controlling a border region during camera shooting in an electronic device according to an embodiment.

FIG. 8 is a flowchart illustrating an example of a method of controlling a border region during camera shooting in an electronic device according to an embodiment.

Referring to FIGS. 5, 6 and 8, when a shooting-related application (e.g., a camera application) is launched, a processor (e.g., the processor 1220 of FIG. 12 to be described later) of an electronic device (e.g., the electronic device 300 of FIG. 3) may change a state of the border region 322 of the display 400.

According to an embodiment, in operation 810, the processor may start a shooting-related application (e.g., a camera application) based on a user input. For example, a camera module (e.g., the camera module 500 of FIG. 3) may be activated at the start (e.g., using or loading) of the shooting-related application. Alternatively, the camera module (e.g., the camera module 500 of FIG. 3) may be activated depending on an additional user input (e.g., switching of a shooting direction or a selfie mode) after the shooting-related application is started.

According to an embodiment, in operation 820, the processor may change the state of border region 322. For example, the processor may control luminances of pixels in the border region 322 to be less than a specified value (e.g., 1 nit). For example, the processor may deactivate pixels in the border region 322. For another example, the processor may display pixels in the border region 322 in a dark color (e.g., black).

According to an embodiment, in operation 830, the processor may execute shooting through the camera module (e.g., the camera module 500 of FIG. 3) based on the user input. For example, when shooting is executed through the camera module (e.g., the camera module 500 of FIG. 3) while the border region 322 is set to be dark, light leakage may be prevented (or reduced).

According to an embodiment, in operation 840, the processor may terminate the shooting-related application based on a user input. For example, the processor may deactivate the camera module (e.g., the camera module 500 of FIG. 3) at the end of the shooting-related application. Alternatively, the processor may deactivate the camera module (e.g., the camera module 500 of FIG. 3) depending on the user input before the end of the shooting-related application.

According to an embodiment, in operation 850, the processor may release the state change of the border region 322. For example, when using an application other than the shooting-related application or displaying a default screen, the processor may control the border region 322 based on data displayed on the normal region 323 (e.g., restoring a luminance of the border region 322).

Figure 9:
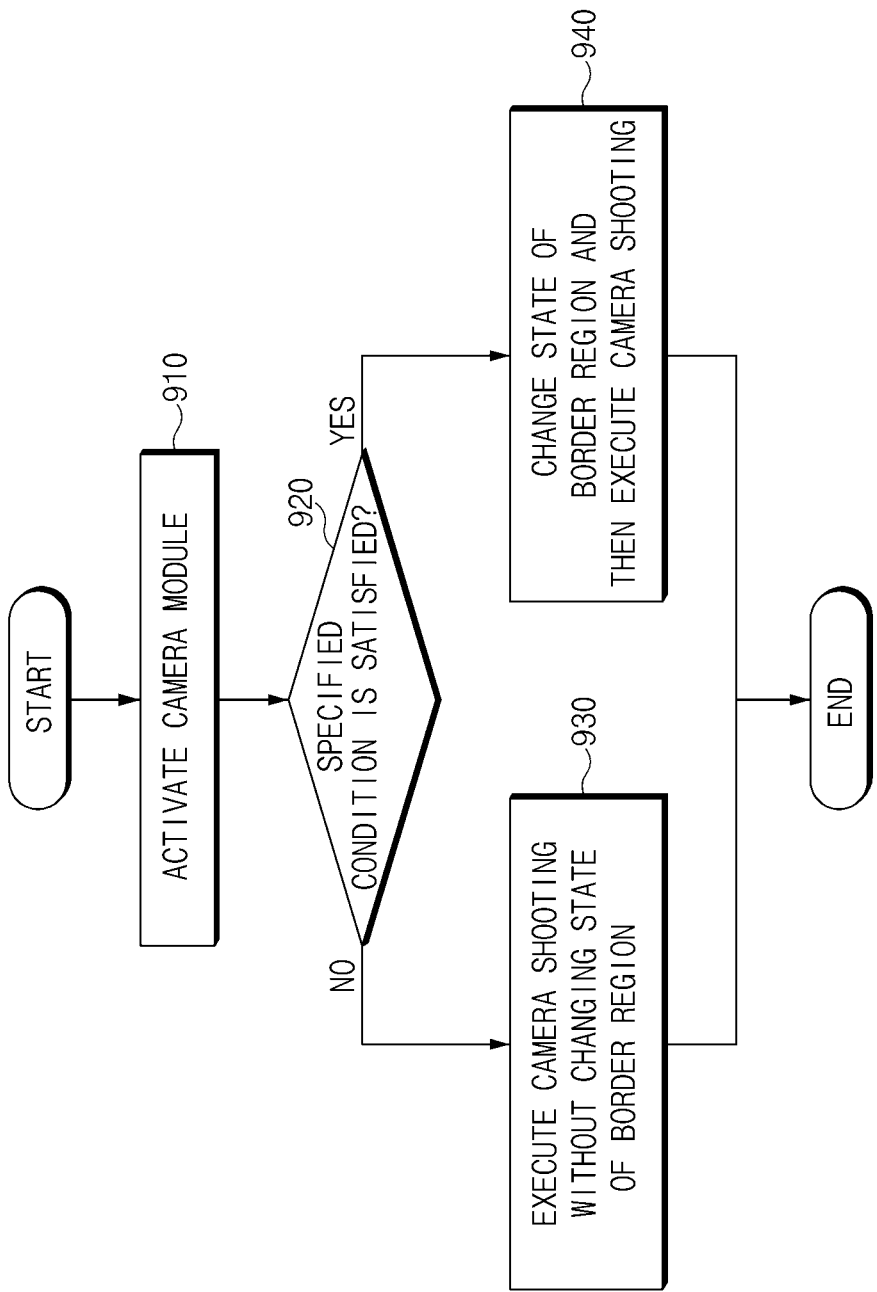
FIG. 9 is a flowchart illustrating an example of a method of controlling a border region depending on a condition during camera shooting in an electronic device according to an embodiment.

FIG. 9 is a flowchart illustrating an example of a method of controlling a border region depending on a condition during camera shooting in an electronic device according to an embodiment.

Referring to FIGS. 5, 6 and 9, a processor (e.g., the processor 1220 of FIG. 12 to be described later) of an electronic device (e.g., the electronic device 300 of FIG. 3) may change a state of the border region 322 of the display 400 based on a shooting condition.

According to an embodiment, in operation 910, the processor may activate a camera module (e.g., the camera module 500 of FIG. 3). For example, the camera module (e.g., the camera module 500 of FIG. 3) may be activated at the start of a shooting-related application. Alternatively, the camera module (e.g., the camera module 500 of FIG. 3) may be activated depending on an additional user input (e.g., switching of a shooting direction or a selfie mode) after the shooting-related application is started.

According to an embodiment, in operation 920, the processor may determine whether the shooting condition satisfies a specified condition. For example, the specified condition may include a case where the camera module (e.g., the camera module 500 of FIG. 3) shoots an image by using a flash, a case where the camera module (e.g., the camera module 500 of FIG. 3) shoots an image in a low illumination (or extremely low illumination) state, or a case where an image is displayed (e.g., the full-angle of view shooting) through at least part of the display 400 in a state where the camera module (e.g., the camera module 500 of FIG. 3) is activated.

According to an embodiment, in operation 930, when the specified condition is not satisfied (e.g., a general shooting condition), the processor may execute shooting through the camera module (e.g., the camera module 500 of FIG. 3)

without changing the state of the border region 322. For example, the processor may control the border region 322 based on data displayed on the normal region 323.

According to an embodiment, in operation 940, when the specified condition is satisfied, the processor may change the state of the border region 322 and then may execute shooting through the camera module (e.g., the camera module 500 of FIG. 3). For example, the processor may deactivate pixels in the border region 322. Alternatively, the processor may display pixels in the border region 322 in a dark color (e.g., black).

As described above, under the specified condition (e.g., a case where the camera module (e.g., the camera module 500 of FIG. 3) shoots an image by using a flash, a case where the camera module (e.g., the camera module 500 of FIG. 3) shoots an image in an extremely low illumination state, or a case where an image is displayed (e.g., the full-angle of view shooting) through at least part of the display 400 in a state where the camera module (e.g., the camera module 500 of FIG. 3) is activated), the processor may prevent (or reduce) light leakage by changing the border region 322 to be dark and then executing shooting through the camera module (e.g., the camera module 500 of FIG. 3).

Figure 10:
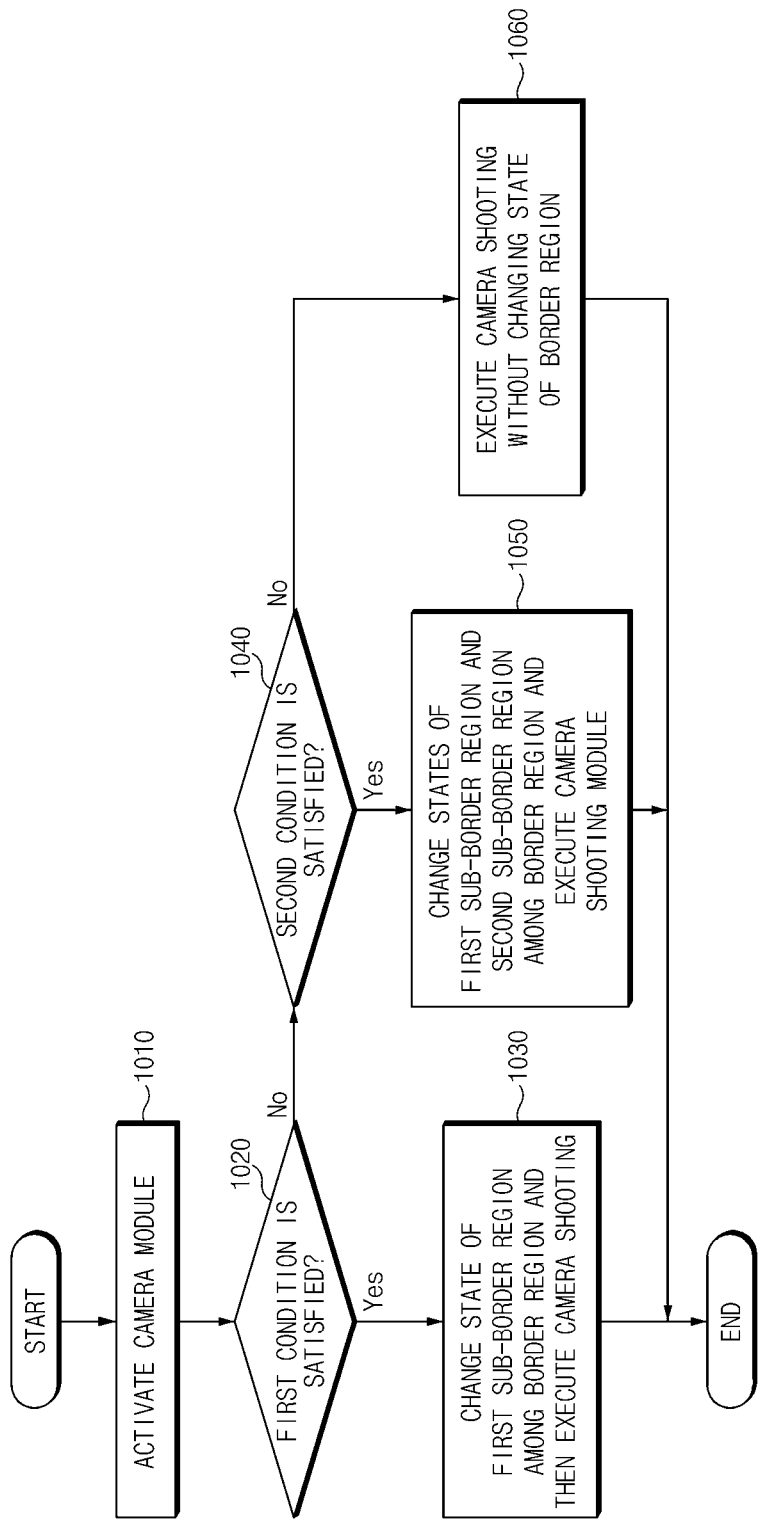
FIG. 10 is a flowchart illustrating another example of a method of controlling a border region depending on a condition during camera shooting in an electronic device according to various embodiments.

FIG. 10 is a flowchart illustrating another example of a method of controlling a border region depending on a condition during camera shooting in an electronic device according to various embodiments.

Referring to FIGS. 5, 7 and 10, a processor (e.g., the processor 1220 of FIG. 12 to be described later) of an electronic device (e.g., the electronic device 300 of FIG. 3) may change a size of the border region 322 stepwise based on a plurality of shooting conditions.

According to an embodiment, in operation 1010, the processor may activate a camera module (e.g., the camera module 500 of FIG. 3). For example, the camera module (e.g., the camera module 500 of FIG. 3) may be activated at the start of a shooting-related application. Alternatively, the camera module (e.g., the camera module 500 of FIG. 3) may be activated depending on an additional user input (e.g., switching of a shooting direction or a selfie mode) after the shooting-related application is started.

According to an embodiment, in operation 1020, the processor may determine whether the shooting condition satisfies a first condition. For example, the first condition may include one of a case where the camera module (e.g., the camera module 500 of FIG. 3) shoots an image by using a flash, a case where the camera module (e.g., the camera module 500 of FIG. 3) shoots an image in a low illumination (or extremely low illumination) state, or a case where an image is displayed (e.g., the full-angle of view shooting) through at least part of the display 400 in a state where the camera module (e.g., the camera module 500 of FIG. 3) is activated.

According to an embodiment, when the first condition is satisfied in operation 1020, the processor may perform operation 1030.

According to an embodiment, in operation 1030, the processor may change a state of the first sub-border region 322a among the border region 322, and then may execute shooting through the camera module (e.g., the camera module 500 of FIG. 3). For example, the processor may deactivate pixels in the first sub-border region 322a. Alternatively, the processor may display the pixels in the first sub-border region 322a in a dark color (e.g., black). The processor may control the second sub-border region 322b based on data displayed in the normal region 323.

According to an embodiment, when the first condition is not satisfied in operation 1020, the processor may perform operation 1040.

According to an embodiment, in operation 1040, the processor may determine whether the shooting condition satisfies a second condition. For example, the second condition may include one, which is different from the first condition, from among a case where the camera module (e.g., the camera module 500 of FIG. 3) shoots an image by using a flash, a case where the camera module (e.g., the camera module 500 of FIG. 3) shoots an image in an extremely low illumination state, or a case where an image is displayed (e.g., the full-angle of view shooting) through at least part of the display 400 in a state where the camera module (e.g., the camera module 500 of FIG. 3) is activated.

According to an embodiment, when the second condition is satisfied in operation 1040, the processor may perform operation 1050.

According to an embodiment, in operation 1050, the processor may change the state of the border region 322 (or both the first sub-border region 322a and the second sub-border region 322b) and may execute shooting through the camera module (e.g., the camera module 500 of FIG. 3). For example, the processor may deactivate pixels in the border region 322. Alternatively, the processor may display pixels in the border region 322 in a dark color (e.g., black).

According to an embodiment, when the first condition is not satisfied (e.g., a general shooting condition) in operation 1040, the processor may perform operation 1060.

According to an embodiment, in operation 1060, the processor may execute shooting through the camera module (e.g., the camera module 500 of FIG. 3) without changing the state of the border region 322. For example, the processor may control the border region 322 based on data displayed on the normal region 323.

As described above, the processor may set the size of the border region 322 stepwise depending on various shooting conditions.

Figure 11:
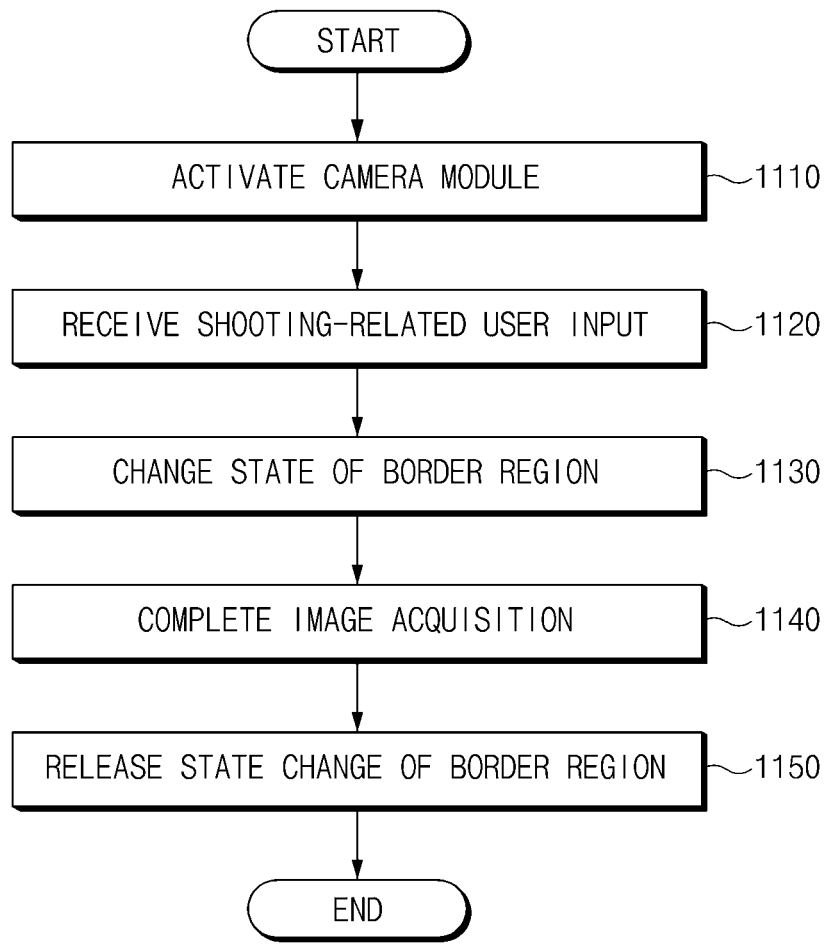
FIG. 11 is a flowchart illustrating another example of a method of controlling a border region during camera shooting in an electronic device according to various embodiments.

FIG. 11 is a flowchart illustrating another example of a method of controlling a border region during camera shooting in an electronic device according to various embodiments.

Referring to FIGS. 5, 7 and 11, a processor (e.g., the processor 1220 of FIG. 12 to be described later) of an electronic device (e.g., the electronic device 300 of FIG. 3) may change a state of the border region 322 of the display 400 based on a shooting-related user input.

According to an embodiment, in operation 1110, the processor may activate a camera module (e.g., the camera module 500 of FIG. 3). For example, the camera module (e.g., the camera module 500 of FIG. 3) may be activated at the start of a shooting-related application (e.g., a camera application). Alternatively, the camera module (e.g., the camera module 500 of FIG. 3) may be activated depending on an additional user input (e.g., switching of a shooting direction or a selfie mode) after the shooting-related application is started.

According to an embodiment, in operation 1120, the processor may receive a shooting-related user input. For example, the shooting-related user input may refer to a shooting execution input received in a state where the camera module (e.g., the camera module 500 of FIG. 3) is activated. For another example, the shooting-related user input may include a user input (e.g., a camera switching input) to activate the camera module (e.g., the camera module 500 of FIG. 3) in a state where the camera module (e.g., the camera module 500 of FIG. 3) is deactivated.

According to an embodiment, in a state where the camera module (e.g., the camera module 500 of FIG. 3) is activated, in operation 1130, the processor may change the state of the border region 322 based on the shooting-related user input. For example, when receiving the shooting execution input in a state where the camera module (e.g., the camera module 500 of FIG. 3) is activated, the processor may control the luminance of pixels in the border region 322 to be less than a specified value (e.g., 1 nit) (e.g., deactivation or displaying in a dark color (e.g., black)).

According to an embodiment, in operation 1140, the processor may obtain an image corresponding to a subject in a state where the state of the border region 322 is changed.

According to an embodiment, in operation 1150, the processor may release state change of the border region 322 after image acquisition is completed. For example, the processor may change the state of the border region 322 only during a period (e.g., operation 1140) in which an image is obtained.

According to another embodiment, in operation 1130, the processor may receive an input to activate the camera module (e.g., the camera module 500 of FIG. 3) in a state where the camera module (e.g., the camera module 500 of FIG. 3) is deactivated. In operation 1130, the processor may change the state of the border region 322 based on the activation of the camera module (e.g., the camera module 500 of FIG. 3).

According to another embodiment, in operation 1140, the processor may obtain an image corresponding to a subject through a camera module (e.g., the camera module 500 of FIG. 3).

According to another embodiment, in operation 1150, when receiving a user input to deactivate the camera module (e.g., the camera module 500 of FIG. 3), the processor may release a state change of the border region while deactivating the camera module (e.g., the camera module 500 of FIG. 3). For example, the processor may change the state of the border region 322 while the camera module (e.g., the camera module 500 of FIG. 3) is activated.

The operations (e.g., operations 810 to 850, operations 910 to 940, operations 1010 to 1060, or operations 1110 to 1150) described with reference to the process and the method illustrated in FIGS. 8 to 11 may be executed by a successive method, a parallel method, a repeated method, or a heuristic method. For example, the operations may be executed in different sequences, a part of the operations may be omitted, or another operation may be added to the operations.

FIG. 12 is a block diagram illustrating an electronic device 1201 in a network environment 1200 according to various embodiments. Referring to FIG. 12, the electronic device 1201 in the network environment 1200 may communicate with an electronic device 1202 via a first network 1298 (e.g., a short-range wireless communication network), or an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include a processor 1220, a memory 1230, an input device 1250, a sound output device 1255, a display device 1260, an audio module 1270, a sensor module 1276, an interface 1277, a haptic module 1279, a camera module 1280, a power management module 1288, a battery 1289, a communication module 1290, a subscriber identification module (SIM) 1296, or an antenna module 1297. In some embodiments, at least one (e.g., the display device 1260 or the camera module 1280) of the components may be omitted from the electronic device 1201, or one or more other components may be added in the electronic device 1201. In some embodiments, some of the components may be implemented as single integrated circuitry. For example, the sensor module 1276 (e.g., a fingerprint sensor, an iris sensor, or an illuminance sensor) may be implemented as embedded in the display device 1260 (e.g., a display).

The processor 1220 may execute, for example, software (e.g., a program 1240) to control at least one other component (e.g., a hardware or software component) of the electronic device 1201 coupled with the processor 1220, and may perform various data processing or computation. According to one embodiment, as at least part of the data processing or computation, the processor 1220 may load a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include a main processor 1221 (e.g., a central processing unit (CPU) or an application processor (AP)), and an auxiliary processor 1223 (e.g., a graphics processing unit (GPU), an image signal processor (ISP), a sensor hub processor, or a communication processor (CP)) that is operable independently from, or in conjunction with, the main processor 1221. Additionally or alternatively, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control at least some of functions or states related to at least one component (e.g., the display device 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment, the auxiliary processor 1223 (e.g., an image signal processor or a communication processor) may be implemented as part of another component (e.g., the camera module 1280 or the communication module 1290) functionally related to the auxiliary processor 1223.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input device 1250 may receive a command or data to be used by other component (e.g., the processor 1220) of the electronic device 1201, from the outside (e.g., a user) of the electronic device 1201. The input device 1250 may include, for example, a microphone, a mouse, a keyboard, or a digital pen (e.g., a stylus pen).

The sound output device 1255 may output sound signals to the outside of the electronic device 1201. The sound output device 1255 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1260 may visually provide information to the outside (e.g., a user) of the electronic device 1201. The display device 1260 may include, for example, a display, a hologram device, or a projector and control circuitry to control a corresponding one of the display, hologram device, and projector. According to an embodiment, the display device 1260 may include touch circuitry adapted to detect a touch, or sensor circuitry (e.g., a pressure sensor) adapted to measure the intensity of force incurred by the touch.

The audio module 1270 may convert a sound into an electrical signal and vice versa. According to an embodiment, the audio module 1270 may obtain the sound via the input device 1250, or output the sound via the sound output device 1255 or a headphone of an external electronic device (e.g., an electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment, the interface 1277 may include, for example, a high definition multimedia interface (HDMI), a universal serial bus (USB) interface, a secure digital (SD) card interface, or an audio interface.

The connecting terminal 1278 may include a connector via which the electronic device 1201 may be physically connected with the external electronic device (e.g., the electronic device 1202). According to an embodiment, the connecting terminal 1278 may include, for example, a HDMI connector, a USB connector, a SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to one embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or infrared data association (IrDA)) or the second network 1299 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The antenna module 1297 may transmit or receive a signal or power to or from the outside (e.g., the external electronic device) of the electronic device 1201. According to an embodiment, the antenna module 1297 may include an antenna including a radiating element composed of a conductive material or a conductive pattern formed in or on a substrate (e.g., PCB). According to an embodiment, the antenna module 1297 may include a plurality of antennas. In such a case, at least one antenna appropriate for a communication scheme used in the communication network, such as the first network 1298 or the second network 1299, may be selected, for example, by the communication module 1290 (e.g., the wireless communication module 1292) from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1201 and the external electronic device 1204 via the server 1208 coupled with the second network 1299. Each of the electronic devices 1202 and 1204 may be a device of a same type as, or a different type, from the electronic device 1201. According to an embodiment, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1240) including one or more instructions that are stored in a storage medium (e.g., internal memory 1236 or external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments disclosed in this specification, light leakage may be minimized during shooting by controlling pixels around a camera exposure region of a display at least partially overlapping with a camera module up and down, to the specified luminance or less.

According to various embodiments disclosed in this specification, a size of a surrounding region (e.g., a border region) of the camera exposure region controlled to the specified luminance or less may be adjusted step by step depending on a shooting condition.

Besides, a variety of effects directly or indirectly understood through the specification may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a display;
a camera module disposed in an active area of the display and including at least one lens; and
a processor operatively connected to the camera module and the display,
wherein the active area includes:
a camera exposure region at least partially overlapping with the at least one lens, the camera exposure region including a transparent region and an opaque region surrounding a periphery of the transparent region, wherein pixels are not disposed in the opaque region, and
a border region surrounding a periphery of the camera exposure region in a direction corresponding to an optical axis of the at least one lens, wherein the border region comprises a plurality of light-emitting pixels, and
wherein the processor is configured to:
when a shooting-related application is executed or when the camera module is activated, control a light emittance of the plurality of light-emitting pixels of the border region to be within a specified luminance range.

2. The electronic device of claim 1, wherein the processor is further configured to:
determine a size of the border region based on a thickness of the display and an angle of view of the at least one lens.

3. The electronic device of claim 1, wherein the processor is further configured to:
when the shooting-related application is executed or when the camera module is activated, control the light emittance of the plurality of light-emitting pixels in the border region such that the plurality of light-emitting pixels appear black; and
when the shooting-related application is terminated, control the light emittance of the plurality of light-emitting pixels of the border region to be within another specified luminance range.

4. The electronic device of claim 1, wherein the processor is further configured to:
assign different thicknesses of the border region in different directions centered on the camera exposure region.

5. An electronic device comprising:
a camera module including at least one lens;
a display including:
a camera exposure region at least partially overlapping with the at least one lens, the camera exposure region including a transparent region and an opaque region surrounding a periphery of the transparent region, wherein pixels are not disposed in the opaque region, and
a border region surrounding a periphery of the camera exposure region in a direction corresponding to an optical axis of the at least one lens; and
a processor operatively connected to the camera module and the display,
wherein the processor is configured to:
when the camera module is activated and a specified condition is satisfied, control a luminance of the border region to be within a specified range.

6. The electronic device of claim 5, wherein the processor is further configured to:
when the specified condition is release, control the luminance of the border region to be within another specified range.

7. The electronic device of claim 5, further comprising:
a flash,
wherein the processor is further configured to:
when shooting is executed through the camera module by using the flash, control the luminance of the border region to be within the specified range.

8. The electronic device of claim 5, wherein the processor is further configured to:
when shooting is executed through the camera module in a state where an image is displayed through at least part of the display, control the luminance of the border region to be within the specified range.

9. The electronic device of claim 5, wherein the specified condition includes a first condition and a second condition, and
wherein the processor is further configured to:
when satisfying the first condition, control the border region to have a first size.

10. The electronic device of claim 9, wherein the processor is configured to:
when satisfying the second condition, control the border region to have a second size greater than the first size.

11. The electronic device of claim 5, wherein the specified condition includes a first condition and a second condition, and
wherein the processor is further configured to:
divide the border region into a first sub-border region and a second sub-border region surrounding a periphery of the first sub-border region; and
when satisfying the first condition, change a state of the first sub-border region to be displayed in black.

12. The electronic device of claim 11, wherein the processor is configured to:
when satisfying the second condition, change a state of the first sub-border region and a state of the second sub-border region to be displayed in black.

13. An electronic device comprising:
a camera module including at least one lens;
a display including:
a camera exposure region at least partially overlapping with the at least one lens, the camera exposure region including a transparent region and an opaque region surrounding a periphery of the transparent region, wherein pixels are not disposed in the opaque region, and
a border region surrounding a periphery of the camera exposure region in a direction corresponding to an optical axis of the at least one lens; and
a processor operatively connected to the camera module and the display,
wherein the processor is configured to:
when a first user input is received through the display, control a luminance of the border region to be within a specified range.

14. The electronic device of claim 13, wherein the processor is further configured to:

after the camera module is activated, receive the first user input for obtaining an image for an external subject of the electronic device; and based on the first user input, deactivate the border region or display the border region in black and obtain the image through the camera module.

15. The electronic device of claim 14, wherein the processor is further configured to:

after the obtaining of the image is completed, control the luminance of the border region to be within another specified range.

16. The electronic device of claim 13, further comprising:

a memory storing a camera application, wherein the processor is further configured to:

when the camera application is executed, receive the first user input corresponding to activation of the camera module; and based on the first user input, deactivate the border region or display the border region in black and activate the camera module.

17. The electronic device of claim 16, wherein the processor is further configured to:

receive a second user input corresponding to deactivation of the camera module; and based on the second user input, deactivate the camera module and control the luminance of the border region to be within another specified range.

18. The electronic device of claim 13, wherein the camera module includes a first camera module facing a first direction and a second camera module facing a second direction opposite to the first direction, and wherein the processor is further configured to:

activate the second camera module based on execution of a camera application included in the electronic device;

receive a second user input corresponding to a switch from the second camera module to the first camera module; and based on the second user input, deactivate the border region or display the border region in black and activate the first camera module.

19. The electronic device of claim 18, wherein the processor is further configured to:

in a state where the first camera module is activated, receive a third user input corresponding to a switch from the first camera module to the second camera module; and based on the third user input, deactivate the first camera module and control the luminance of the border region to be within another specified range.

20. The electronic device of claim 18, wherein the processor is further configured to:

in a state where the first camera module is activated, receive a fourth user input corresponding to termination of the camera application; and based on the fourth user input, deactivate the first camera module and control the luminance of the border region to be within another specified range.

* * * * *